United States Patent
Jung

(10) Patent No.: US 9,506,419 B2
(45) Date of Patent: Nov. 29, 2016

(54) CONTROLLING COMBUSTION NOISE OF DIESEL FUEL

(71) Applicant: HYUNDAI MOTOR COMPANY, Seoul (KR)

(72) Inventor: In Soo Jung, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 211 days.

(21) Appl. No.: 14/558,474

(22) Filed: Dec. 2, 2014

(65) Prior Publication Data

US 2016/0025032 A1 Jan. 28, 2016

(30) Foreign Application Priority Data

Jul. 28, 2014 (KR) ........................ 10-2014-0095971

(51) Int. Cl.
*G06F 19/00* (2011.01)
*F02D 41/40* (2006.01)
*F02D 41/14* (2006.01)
*F02D 35/02* (2006.01)
*F02D 41/28* (2006.01)

(52) U.S. Cl.
CPC ........... *F02D 41/403* (2013.01); *F02D 35/023* (2013.01); *F02D 35/028* (2013.01); *F02D 41/14* (2013.01); *F02D 2041/288* (2013.01); *F02D 2200/025* (2013.01); *Y02T 10/44* (2013.01)

(58) Field of Classification Search
CPC .................. B60W 2030/206; F02D 41/1498; F02D 19/025; F02D 41/22
USPC ......... 701/101, 105, 111, 114; 123/299, 305, 123/695
See application file for complete search history.

(56) References Cited

U.S. PATENT DOCUMENTS

| 2001/0017127 A1* | 8/2001 | Flynn | F02B 1/12 123/435 |
| 2001/0052335 A1* | 12/2001 | Miyakubo | F02B 1/04 123/305 |
| 2004/0099226 A1* | 5/2004 | Bromberg | B01J 19/0006 123/3 |

(Continued)

FOREIGN PATENT DOCUMENTS

| JP | 2000-064892 A | 2/2000 |
| JP | 2004-011501 A | 1/2004 |

(Continued)

OTHER PUBLICATIONS

Notice of Allowance Korean Patent Application No. 10-2014-0095971 dated Sep. 25, 2015.

*Primary Examiner* — John Kwon
(74) *Attorney, Agent, or Firm* — McDermott Will & Emery LLP

(57) ABSTRACT

Disclosed herein is a method of controlling combustion noise of diesel fuel. The method includes steps of setting a first target value indicating a crank angle at a maximum heat release rate and a second target value indicating a combustion noise index; calculating the value of X, which is the difference between a crank angle under the current conditions of a vehicle and the first target value and calculating the value of Y, which is the difference between a combustion noise index under the current conditions of the vehicle and the second target value; setting a third target value indicating a value of Y for the value of X, and calibrating the amount of pilot fuel injected into an engine according to the difference between the value of Y and the third target value.

8 Claims, 5 Drawing Sheets

(56) References Cited

U.S. PATENT DOCUMENTS

| | | | | |
|---|---|---|---|---|
| 2004/0219079 | A1* | 11/2004 | Hagen | F01K 21/047 422/607 |
| 2011/0224886 | A1* | 9/2011 | Wang | F02D 19/08 701/103 |
| 2012/0145122 | A1* | 6/2012 | Kurtz | F02D 41/0025 123/299 |
| 2015/0000631 | A1* | 1/2015 | Choi | F02D 41/402 123/305 |

FOREIGN PATENT DOCUMENTS

| | | |
|---|---|---|
| JP | 2012-154244 A | 8/2012 |
| KR | 10-2012-0008668 A | 2/2012 |
| KR | 10-2013-0137395 A | 12/2013 |
| KR | 10-1338466 B1 | 12/2013 |
| KR | 10-2014-0005403 A | 1/2014 |

* cited by examiner (X-AXIS: ENGINE RPM, Y-AXIS: FUEL AMOUNT)

|  | 1000 | 1500 | ... | 3500 | 4000 |
|---|---|---|---|---|---|
| 5mg | 18° | 16° | ... | 13° | 10° |
| 10mg | 18° | 16° | ... | 13° | 10° |
| ... | ... | ... | ... | ... | ... |
| FULL LOAD | 16° | 14° | ... | 11° | 8° |

FIG. 2B (X-AXIS: ENGINE RPM, Y-AXIS: FUEL AMOUNT)

|           | 1000  | 1500  | ...  | 3500  | 4000  |
|-----------|-------|-------|------|-------|-------|
| 5mg       | 165dB | 166dB | ...  | 167dB | 168dB |
| 10mg      | 166dB | 167dB | ...  | 168dB | 169dB |
| 15mg      | 167dB | 168dB | ...  | 169dB | 170dB |
| ...       | ...   | ...   | ...  | ...   | ...   |
| FULL LOAD | 168dB | 169dB | ...  | 170dB | 171dB |

FIG. 2C

X-AXIS: ENGINE RPM, Y-AXIS: DIFFERENCE BETWEEN CURRENT CRANK ANGLE AND FIRST TARGET VALUE

|     | 1000 | 1500 | 2000 | ...  | 4000 |
|-----|------|------|------|------|------|
| 1°  | 1dB  | 2dB  | 2dB  | ...  | 1dB  |
| 2°  | 2dB  | 3dB  | 3dB  | ...  | 1dB  |
| 3°  | 3dB  | 4dB  | 4dB  | ...  | 2dB  |
| ... | ...  | ...  | ...  | ...  | ...  |

CONTROLLING COMBUSTION NOISE OF DIESEL FUEL

CROSS REFERENCE TO RELATED APPLICATION

The present application claims priority to Korean Patent Application No. 10-2014-0095971, filed Jul. 28, 2014, the entire contents of which is incorporated herein for all purposes by this reference.

BACKGROUND

1. Field of the Application

The present disclosure relates generally to a method and a system for controlling a combustion noise of diesel fuel and, more particularly, to a method and a system for controlling a combustion noise of diesel fuel to reduce a combustion noise of a diesel engine and improve fuel efficiency thereof by controlling injection parameters for the engine and a cylinder pressure level and adjusting a main injection timing with the use of a crank angle at a predetermined maximum heat release rate and a combustion noise index.

2. Description of the Related Art

As well known in the art, in the control of an internal combustion engine, a fuel injection mode changes in accordance with the operation conditions of the engine.

To this end, a main injection in the engine is preceded by a choice between a first injection mode, wherein a first pilot injection and a second pilot injection are conducted, and a second injection mode, wherein a main injection is conducted, in accordance with the engine operation conditions, and then fuel is injected in the selected injection mode.

Therefore, a change in a crank angle at an optimum heat release rate highly depends on the engine operation conditions, rather than showing a consistent pattern.

In particular, MFB50 (Mass Fraction Burned 50), a crank angle at which the heat release rate due to a combustion pressure reaches 50%, is used as a criterion for combustion control.

Meanwhile, open loop control has been widely used for the control of fuel injection in an engine. However, the method is giving place to closed loop control to calibrate emission, drivability and instability of engine operations resulting from variations in hardware.

Closed loop control involves setting target values of injection parameters by using a combustion pressure for an engine operating under the standard conditions (e.g. temperature and fuel status), obtaining measurement values of injection parameters for the combustion state of the engine in use in the same method used for determining the target value of injection parameters, calibrating a main injection timing during which fuel is injected into the engine in case that the target values and the measurement values of injection parameters are different, and stabilizing the engine combustion to the same level as under the standard conditions, thereby reducing exhaust gas.

To reduce exhaust gas, when the measurement values of injection parameters are retarded in comparison with the target values of injection parameters, the main injection timing is advanced to stabilize the engine combustion to the same level as under the standard conditions.

Meanwhile, in North America, where a cetane number varies in a wide range, manufacturers pursue fuel stability by using a cylinder pressure sensor. For this, they control the main injection timing of fuel into an engine to control a maximum combustion pressure regardless of a change in the cetane number.

Here, the existing configuration and system as above is based on a control logic to pursue combustion stability, whereas the present disclosure relates to a method and a system for controlling a combustion noise of diesel fuel, which employ the concept of a combustion noise index and reduce a combustion noise by controlling the pilot injection amount before the main fuel injection, rather than using the control logic as described above for fuel stability.

A Korean conventional art entitled "Fuel Injection Method for Decreasing Diesel Engine Combustion Noise" has been disclosed. However, the above disclosure is effective in that the reduction rate for a pressure increase slope of a combustion pressure (cylinder pressure) in a combustion chamber is surged by splitting the total amount of fuel to be injected into an engine into a pilot injection amount and a split injection amount, but has its limitations in that it does not disclose a technical idea, like that of the present disclosure, in which the concept of a combustion noise index is employed to control a pilot fuel injection amount by comparing with the preset target values of injection parameters.

The present disclosure illustrates and describes specific embodiments, but it will be obvious to those skilled in the art that the disclosure can be improved and modified in various ways within the technical spirit of the disclosure provided by the appended claims.

SUMMARY

In one general aspect, the instant disclosure describes a method that includes steps of: setting a first target value indicating a crank angle at a maximum heat release rate and a second target value indicating a combustion noise index; calculating the value of X, which is the difference between a crank angle under the current conditions of a vehicle and the first target value, and the value of Y, which is the difference between a combustion noise index under the current conditions of the vehicle and the second target value; setting a third target valuefor a value of Y corresponding to the value of X; and calibrating the amount of pilot fuel injected into the engine according to the difference between the value of Y and the third target value.

The first target value and the second target value are set with the use of a fuel amount, an engine RPM, a gear position, an inlet air temperature and a cooling water temperature.

The value of X, which is the difference between a crank angle under the current conditions of a vehicle and the first target value, is calculated and then the main fuel injection timing is calibrated according to the difference.

In the step of calibrating the pilot fuel amount according to the difference between the value of Y and the third target value, the pilot fuel amount is increased if the value of Y is greater than the third target value, and is decreased if the value of Y is less than the third target value.

In another general aspect, the present disclosure describes a system for controlling a combustion noise of diesel fuel. The system includes: a detector for detecting operation conditions of a vehicle; a calculator for calculating the value of X, which is the difference between a crank angle in the current conditions measured by the detector and a first target value indicating a crank angle at a maximum heat release rate, and the value of Y, which is the difference between a combustion noise index of the vehicle under the current conditions measured by the detector and a second target value indicating a preset combustion noise index; a data storage for storing the first target value, the second target value and a third target value indicating a value of Y for the value of X; and a controller for calibrating the pilot fuel amount according to the difference between the value of Y and the third target value.

The data storage stores the first target value and the second target value calculated with the use of a fuel amount, an engine RPM, a gear position, an inlet air temperature and a cooling water temperature.

The controller transmits to a main fuel injection unit a signal for a fuel injection timing calibrated according to the value of X, which is the difference between a crank angle under the current conditions of the vehicle measured by the detector and the first target value.

The controller transmits to the main fuel injection unit a signal for increasing the pilot fuel amount, if the value of Y is greater than the third target value, and a signal for decreasing the pilot fuel amount, if the value of Y is less than the third target value.

BRIEF DESCRIPTION OF THE DRAWINGS

FIG. 1 is an overall flow chart for a method of controlling a combustion noise of diesel fuel, which is part of the present disclosure.

FIGS. 2A to 2C are examples of preset target values.

DESCRIPTION OF THE PREFERRED EMBODIMENTS

The techniques described in the present disclosure have been made keeping in mind the above-mentioned shortcomings of the prior art. The object of the present disclosure is to provide a method and a system for controlling a combustion noise of diesel vehicles to improve fuel efficiency and reduce a combustion noise by employing the concept of a combustion noise index, which is closely related with a combustion noise of diesel vehicles, and calibrating a main injection timing, as well as controlling injection parameters of fuel injected into an engine with the use of the difference between a preset combustion noise index and a measured combustion noise index.

From here on, a preferred embodiment of a method and a system for controlling a combustion noise of diesel fuel is described with reference to the accompanying figures.

Figures 1, 2A:
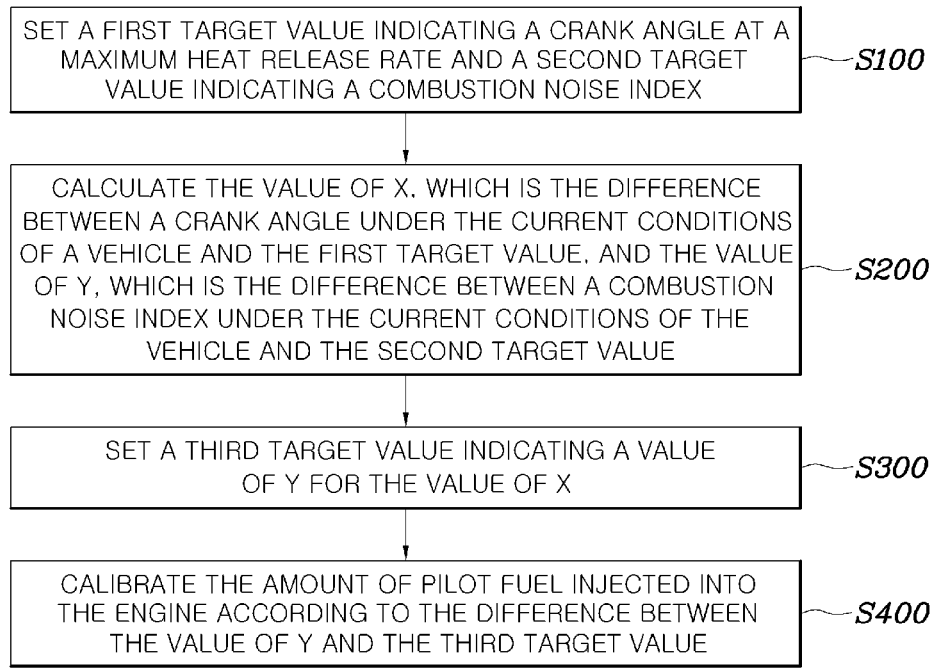
Figure 4:
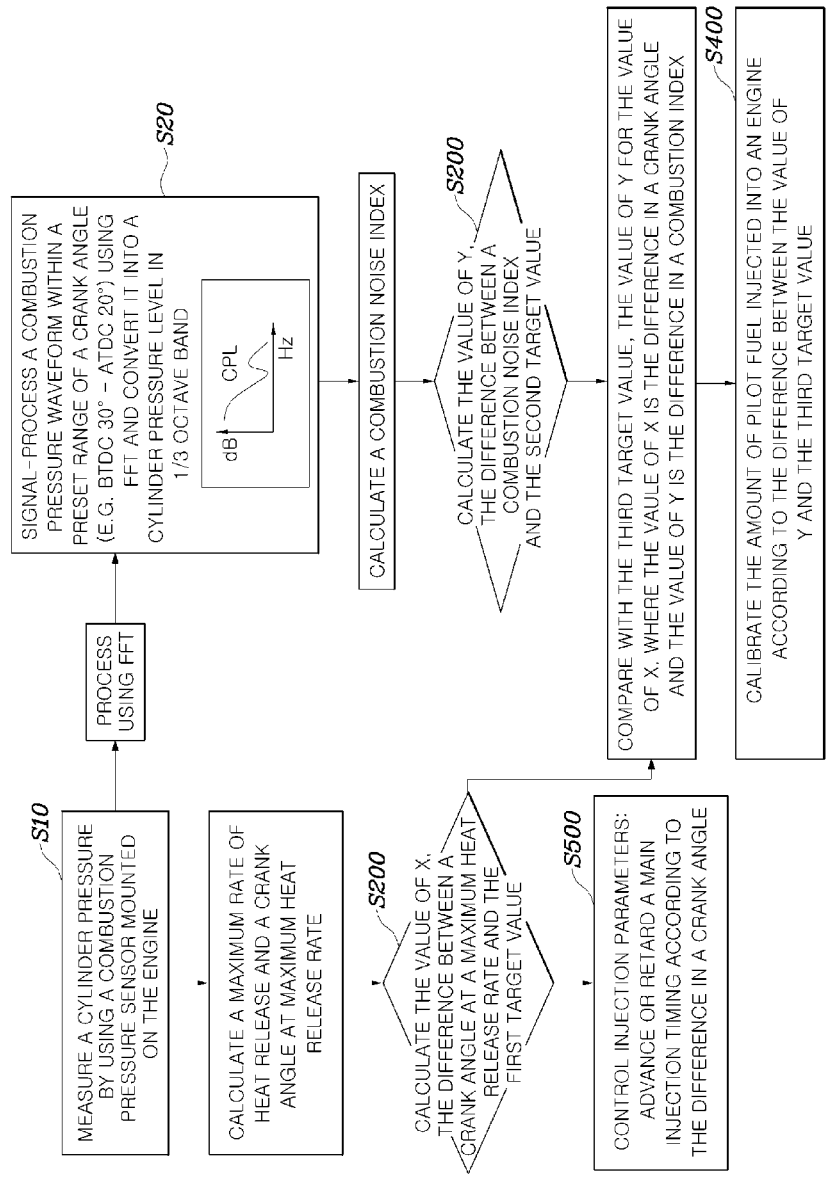
FIG. 4 is a specific flow chart for each step of a method of controlling a combustion noise of diesel fuel.

FIG. 1 is an overall flow chart for a method of controlling a combustion noise of diesel fuel, which is part of the present disclosure, and FIG. 4 is a specific flow chart for each step of a method of controlling a combustion noise of diesel fuel.

As illustrated in the figures, the disclosure includes the steps of: setting a first target value indicating a crank angle at a maximum heat release rate and a second target value indicating a combustion noise index (S100); calculating the value of X, which refers to the difference between the crank angle under the current conditions of a vehicle and the first target value, and the value of Y, which refers to the difference between a combustion noise index under the current conditions of the vehicle and the second target value (S200); setting a third target value indicating a value of Y for the value of X (S300); and controlling the amount of pilot fuel injected into an engine according to the difference between the value of Y and the third target value (S400).

The first step (S100) is carried out to set a first target value indicating a crank angle at a maximum heat release rate, which is preset with the use of a fuel amount, an engine RPM, a gear position, an inlet air temperature and a cooling water temperature.

FIG. 2A shows an example of first target values for a crank angle at a maximum heat release rate. For example, if the engine speed is currently 1,500 rpm and the fuel amount is 10 mg, the first target value is set to 16° as a crank angle at a maximum heat release rate.

Figure 3:
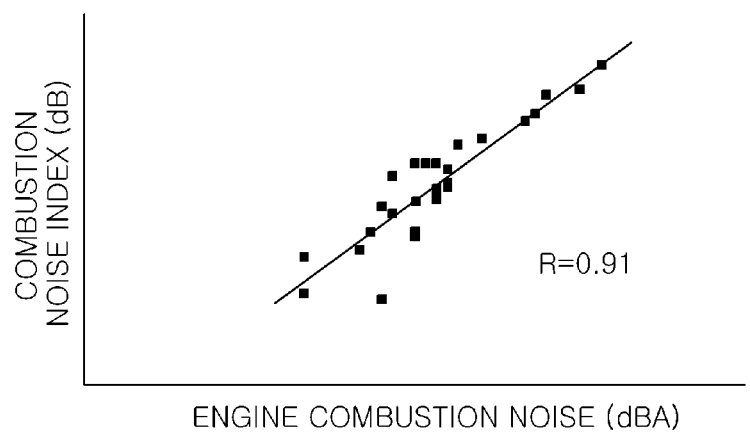
FIG. 3 is a graph illustrating a relationship between a combustion noise index and an engine combustion noise.

Meanwhile, the second target value is also set for a combustion noise index, which is a concept closely related (correlation coefficient: R=0.91) with engine combustion noise as illustrated in FIG. 3 and increases in proportion to engine combustion noise. The measurement method of a combustion noise index will be described later.

A combustion noise index is also a preset value with the use of a fuel amount, an engine RPM, a gear position, an inlet air temperature and a cooling water temperature, as in the step of setting a first target value indicating a crank angle at a maximum heat release rate.

FIG. 2B shows an example of second target values for a combustion noise index. For example, if the engine speed is currently 1,500 rpm and the fuel amount is 10 mg, the second target value is set to 167 dB as a combustion noise index.

Meanwhile, the next step (S200) is carried out to calculate the value of X, which is the difference between the crank angle under the current conditions of the vehicle and the first target value, and the value of Y, which is the difference between the combustion noise index under the current conditions of the vehicle and the second target value.

The value of X, which is the difference between the crank angle for the same engine RPM and the same fuel amount and the preset first target value, is calculated, and likewise, the value of Y, which is the difference between the combustion noise index for the same engine RPM and the same fuel amount and the preset second target value, is calculated.

From here on, a method of measuring the combustion noise index under the current conditions of the vehicle is described in detail with reference to FIG. 4.

A cylinder pressure is measured with the use of a combustion pressure sensor mounted on the engine (S10), and a combustion pressure waveform within a preset range of a crank angle (e.g. BTDC 30°-ATDC 20°) is converted into a cylinder pressure level (CPL) in a ⅓ octave band by signal-processing the waveform with the use of FFT (Fast Fourier Transformation).

As already known, the ⅓ octave band refers to splitting one octave into three, and the TDC stands for Top Dead Center and the BTD stands for Bottom Dead Center. The ATDC is the abbreviation for "After Top Dead Center" and the BTDC is the abbreviation for "Before Top Dead Center."

That is, the waveform can be separated by frequency by signal-processing the measured cylinder pressure with the use of FFT. The cylinder pressure may be converted into a cylinder pressure level (CPL) and for some frequency ranges, the cylinder pressure is converted to the extent of the overall level.

The formula for calculating a combustion noise index is shown in Mathematical Equation 1 below.

$$\text{Combustion Noise Index (CNI)} = 10 \log((10^{(1 \text{ kHz } 1/3 \text{ octave level}/10)} + 10^{(1.25 \text{ kHz } 1/3 \text{ octave level}/10)} + 10^{(1.6 \text{ kHz } 1/3 \text{ octave Level}/10)} + 10^{(2 \text{ kHz } 1/3 \text{ octave level}/10)} + 10^{(2.5 \text{ kHz } 1/3 \text{ octave level}/10)} + 10^{(3.15 \text{ kHz } 1/3 \text{ octave level}/10)}))$$

[Mathematical Equation 1]

That is, in this step, a calculation is made for the value of Y, which is the difference between the combustion noise index of the vehicle obtained through the Mathematical Equation 1 for a combustion noise index calculation and the second target value as a preset combustion noise index.

Meanwhile, the next step (S300) is carried out to set a third target valuefor a value of Y corresponding to the value of X. As illustrated in FIG. 2C, the third target value, which is a value of Y for a value of X, is already stored, wherein the value of X is the difference between the crank angle under the current conditions of the vehicle and the first target value and the value of Y is the difference between each combustion noise index for the engine's RPM and the second target value.

For example, if the difference between the crank angle under the current conditions of the vehicle and the first target value is 3° and the engine speed is 1,500 rpm, the difference between the combustion noise index and the second target value is 4 dB, which is the preset third target value.

From here on, a controlling process of the disclosure using a map above is described.

If the combustion noise index as a second target value is 170 dB for a given RPM and a given fuel amount and the measured combustion noise index is 172 dB, the value of Y as the difference between the two is 2 dB and the combustion noise index is greater than the second target value by 2 dB.

Here, if the value of X, which is the difference between the crank angle at the maximum heat release rate and the first target value as a crank angle, is 3° and the value of Y as the third target value is stored as 1 dB in FIG. 2C, the actual difference is 2 dB, which is 1 dB greater than 1 dB in the table, and is considered to cause a combustion noise, thereby leading to a decision to increase the pilot fuel amount.

That is, the difference between the value of Y and the third target value controls the amount of pilot fuel injected into the engine. The pilot fuel amount is increased, if the value of Y is greater than the third target value, and is decreased, if the value of Y is less than the third target value.

Meanwhile, as already known, a pilot injection, which refers to the creation of combustion environment (improvement of the mix of fuel and air by increasing the temperature in the combustion chamber) before the main fuel injection into the engine, reduces ignition delay and a rate of a combustion pressure increase resulting from main injection.

The pilot injection decreases a pressure increase slope for a combustion pressure in the combustion chamber and prevents a surge of a combustion pressure, thereby improving a vibration oscillator that causes a combustion noise.

Meanwhile, the present disclosure further includes a step (S500), wherein when the combustion noise is deemed loud as above, the amount of pilot fuel supplied to the engine is increased to reduce the combustion noise, and the value of X, which is the difference between the crank angle under the current conditions of the vehicle and the first target value, is calculated and the difference determines the main fuel injection timing.

That is, the main injection timing is advanced if the measured crank angle is retarded in comparison with the first target value, and is retarded if the measured crank angle is advanced in comparison with the first target value. This stabilizes combustion, improves fuel efficiency and reduces an engine noise.

Figure 5:
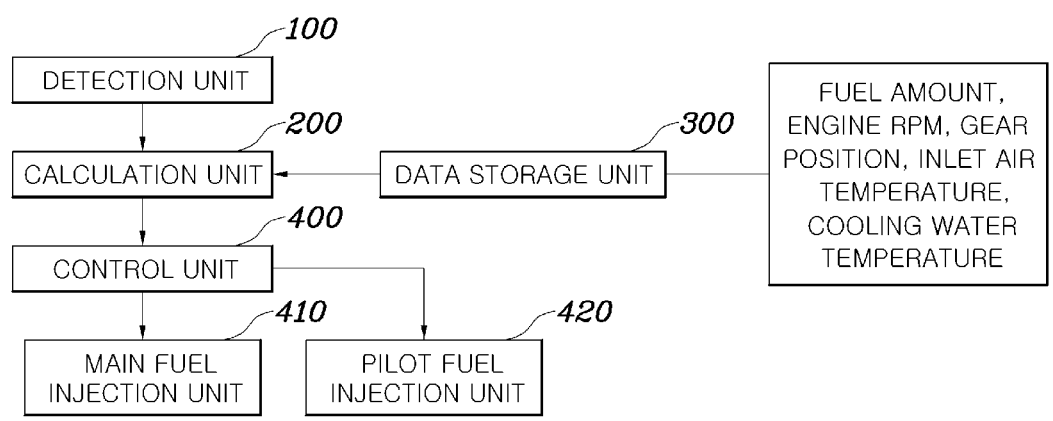
FIG. 5 is a block diagram for a system for controlling a combustion noise of diesel fuel, which is part of the present disclosure.

Meanwhile, as seen in the block diagram for a system for controlling a combustion noise of diesel fuel in FIG. 5, the present disclosure includes a detection unit 100, a calculation unit 200, a data storage unit 300 and a control unit 400. The control unit 400 includes a main fuel injection unit 410 and a pilot fuel injection unit 420.

The main fuel injection unit 410 and the pilot fuel injection unit 420 can employ any type of device, as long as the device can inject fuel into an engine. Meanwhile, the detection unit 100 detects the operation conditions of a vehicle in use, for example, an engine RPM or a fuel amount.

Here, the calculation unit 200 calculates the value of X, which is the difference between the crank angle under the current conditions of the vehicle measured by the detection unit 100 and the first target value, and the value of Y, which is the difference between the combustion noise index under the current conditions of the vehicle measured by the detection unit 100 and the second target value.

Meanwhile, the calculation unit 200 performs the calculation above based on the data stored in the data storage unit 300, where the first target value, the second target value and the third target value as a value of Y corresponding to the value of X are stored. The control unit 400 calibrates the pilot fuel amount according to the difference between the value of Y and the third target value, thereby reducing a combustion noise and improving fuel efficiency.

Here, the data storage unit 300 has the first target value and a second target value determined by a fuel amount, an engine RPM, a gear position, an inlet air temperature and a cooling water temperature.

A main fuel injection timing is calibrated by the value of X, which is the difference between the crank angle under the current conditions of the vehicle and the first target value, and a signal for the main fuel injection timing is transmitted to the main fuel injection unit 410. If the value of Y is greater than the third target value, a signal for increasing the pilot fuel amount is transmitted to the pilot fuel injection unit 420, and if the value of Y is less than the third target value, a signal for decreasing the pilot fuel amount is transmitted to the pilot fuel injection unit 420.

Since the detailed controlling process has already been described, it is omitted here.

The present disclosure illustrates and describes specific embodiments, but it will be obvious to those skilled in the art that the disclosure can be improved and modified in various ways within the technical spirit of the disclosure provided by the appended claims.

The disclosure comprising the above method and system with the configuration above for controlling a combustion noise of diesel fuel has various advantages, such as a decrease in an engine combustion noise and fuel efficiency improvement resulting from the stability of engine combustion.

What is claimed is:

1. A method of controlling a combustion noise of diesel fuel, comprising:
setting a first target value indicating a crank angle at a maximum heat release rate and a second target value indicating a combustion noise index;
calculating a value of X which is a difference between a crank angle under the current conditions of a vehicle and the first target value, and a value of Y which is a difference between a combustion noise index under the current conditions of the vehicle and the second target value;

setting a third target valuefor a value of Y corresponding to the value of X; and calibrating an amount of pilot fuel injected into an engine according to a difference between the value of Y and the third target value.

2. The method of claim 1, wherein the first target value and the second target value are set by using a fuel amount, an engine RPM, a gear position, an inlet air temperature, and a cooling water temperature.

3. The method of claim 1, wherein a value of X, which is a difference between a crank angle under the current conditions of a vehicle and the first target value, is calculated and then a main fuel injection timing is calibrated according to the difference.

4. The method of claim 1, wherein in the step of calibrating a pilot fuel amount according to the difference between the value of Y and the third target value, the pilot fuel amount is increased if a value of Y is greater than the third target value, and is decreased if a value of Y is less than the third target value.

5. A system for controlling a combustion noise of diesel fuel, comprising:

a detector for detecting operation conditions of a vehicle;

a calculator for calculating a value of X, which is a difference between a crank angle under the current conditions of a vehicle measured by the detector and a first target value indicating a crank angle at a maximum heat release rate, and a value of Y, which is a difference between a combustion noise index under the current conditions of the vehicle measured by the detector and a second target value indicating a preset combustion noise index;

a data storage for storing the first target value, the second target value and a third target valuefor a value of Y corresponding to the value of X; and a controller for calibrating a pilot fuel amount according to the difference between the value of Y and the third target value.

6. The system of claim 5, wherein the data storage has the first target value and the second target value stored by using a fuel amount, an engine RPM, a gear position, an inlet air temperature and a cooling water temperature.

7. The system of claim 5, wherein the controller transmits to a main fuel injection unit a signal for a fuel injection timing calibrated according to the value of X, which is a difference between a crank angle under the current conditions of the vehicle measured by the detector and the first target value.

8. The system of claim 5, wherein the controller transmits to a pilot fuel injection unit a signal for increasing a pilot fuel injection amount, if a value of Y is greater than the third target value, and a signal for decreasing a pilot fuel injection amount, if a value of Y is less than the third target value.

* * * * *